INVENTOR.
Robert F. Krupp

Aug. 9, 1966  R. F. KRUPP  3,265,223
MACHINE FOR UNLOADING RETORT CRATES
Original Filed Dec. 26, 1961  12 Sheets-Sheet 2

Fig. 2a

INVENTOR.
Robert F. Krupp
BY
*attorneys*

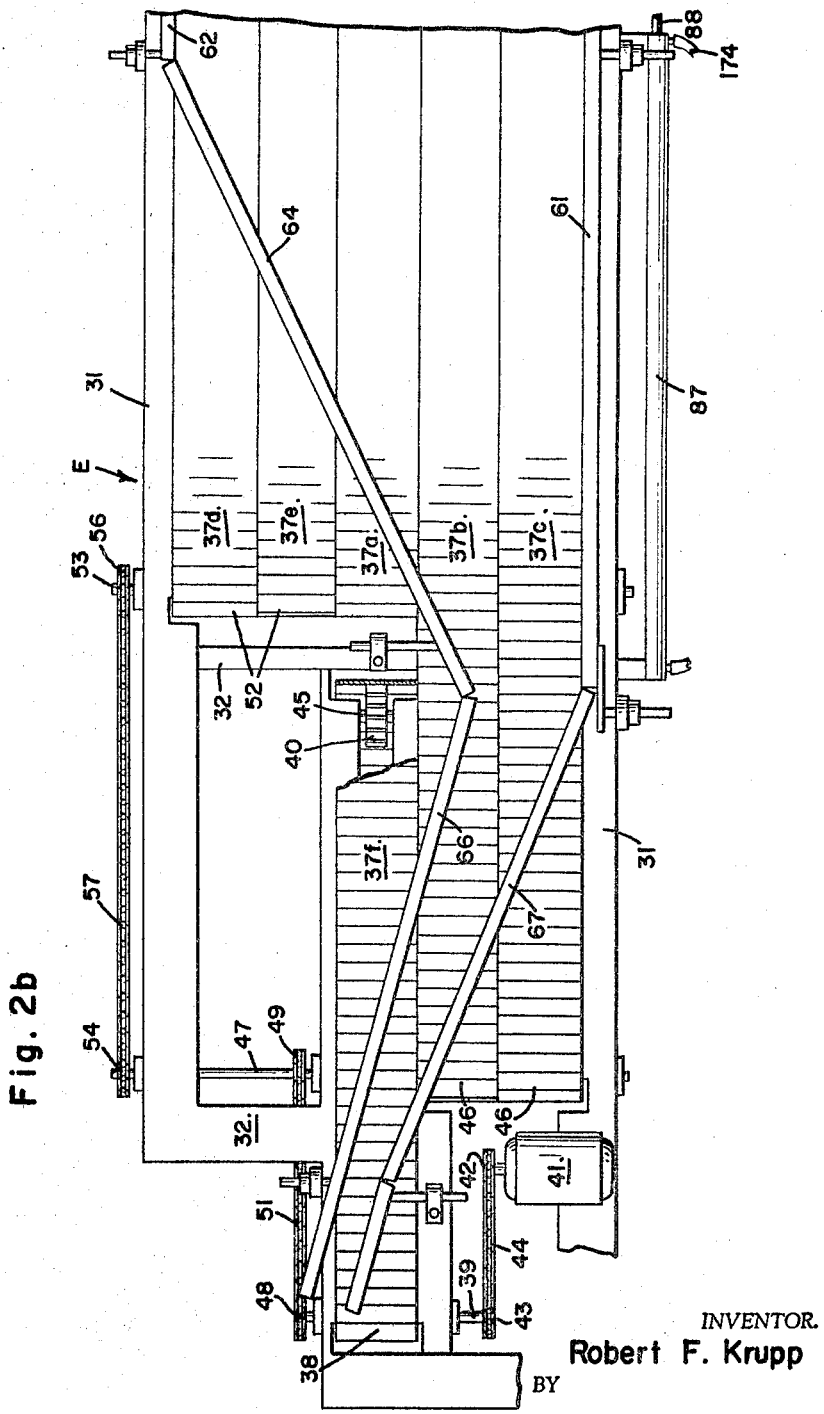

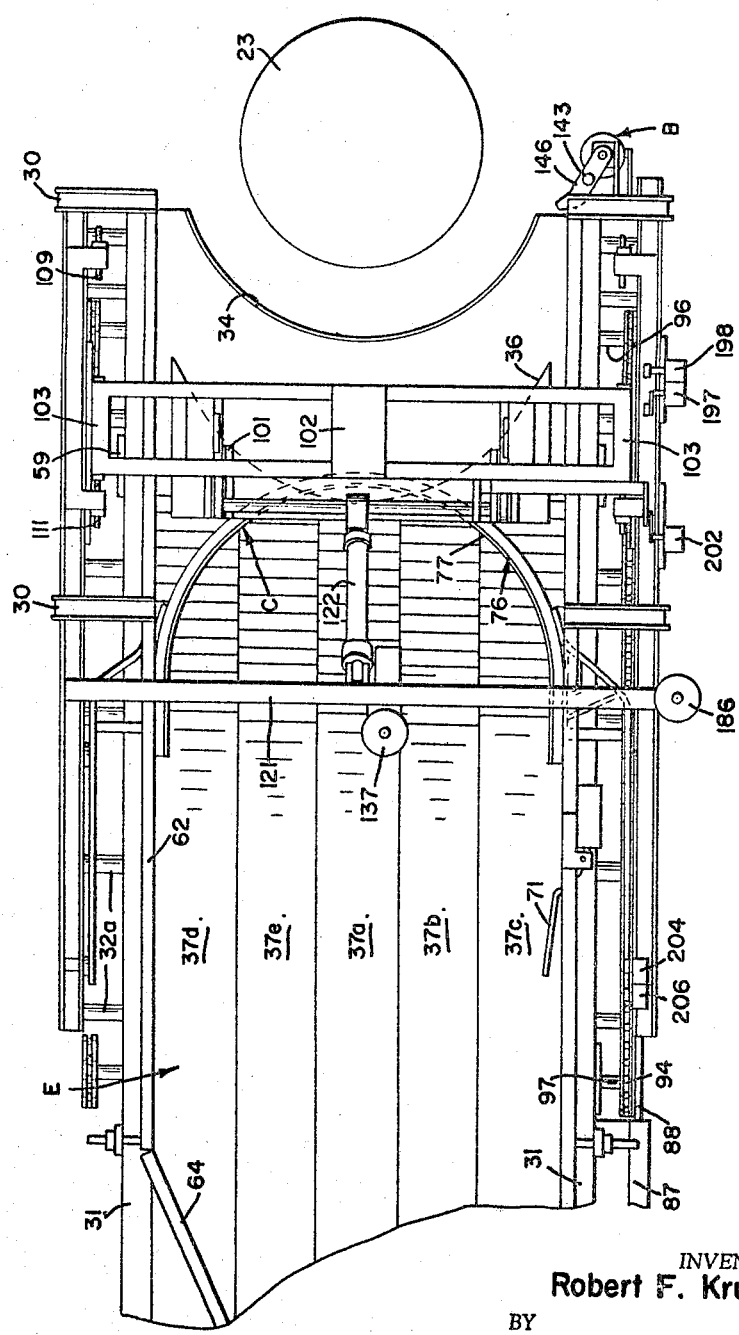

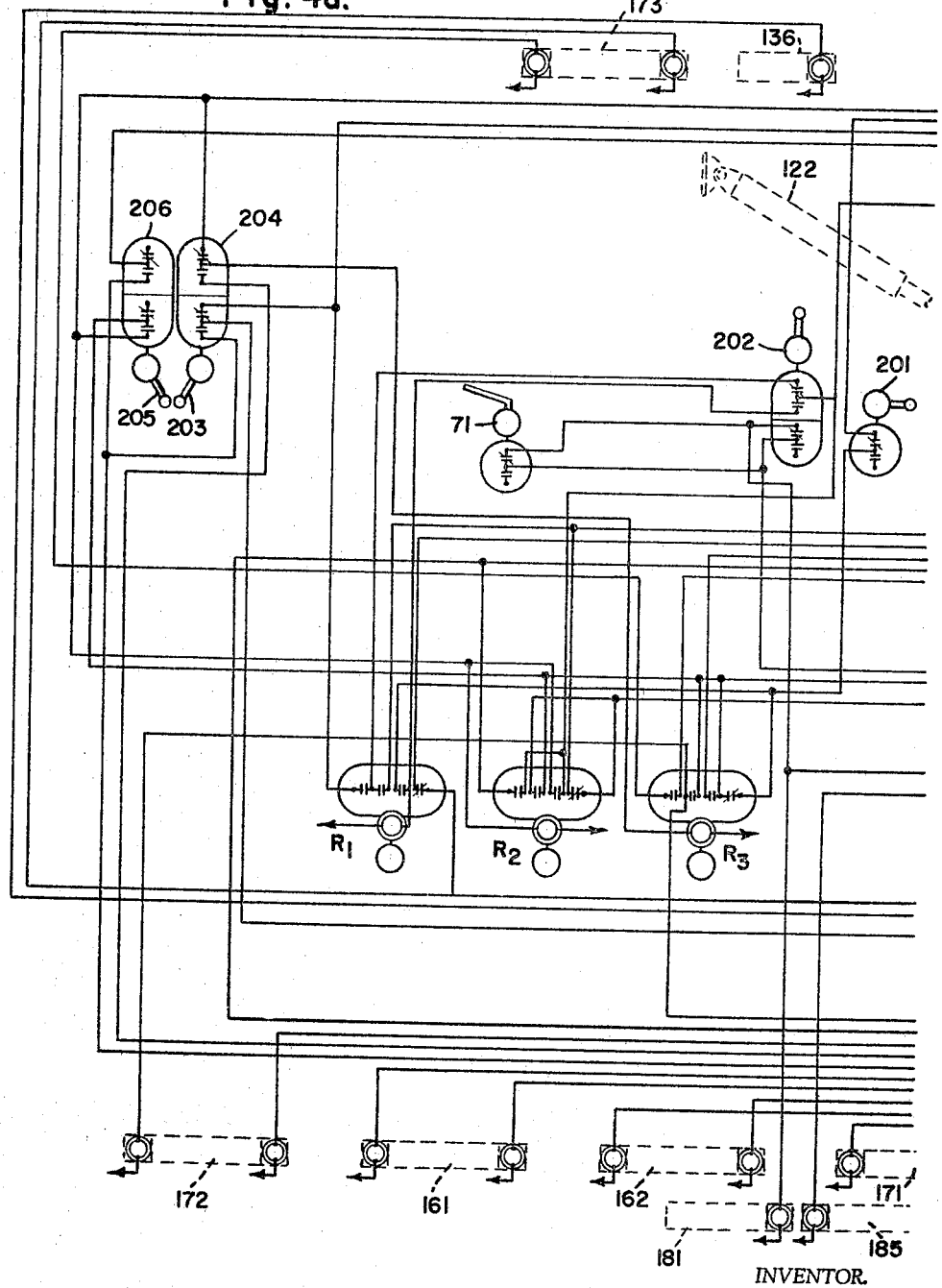

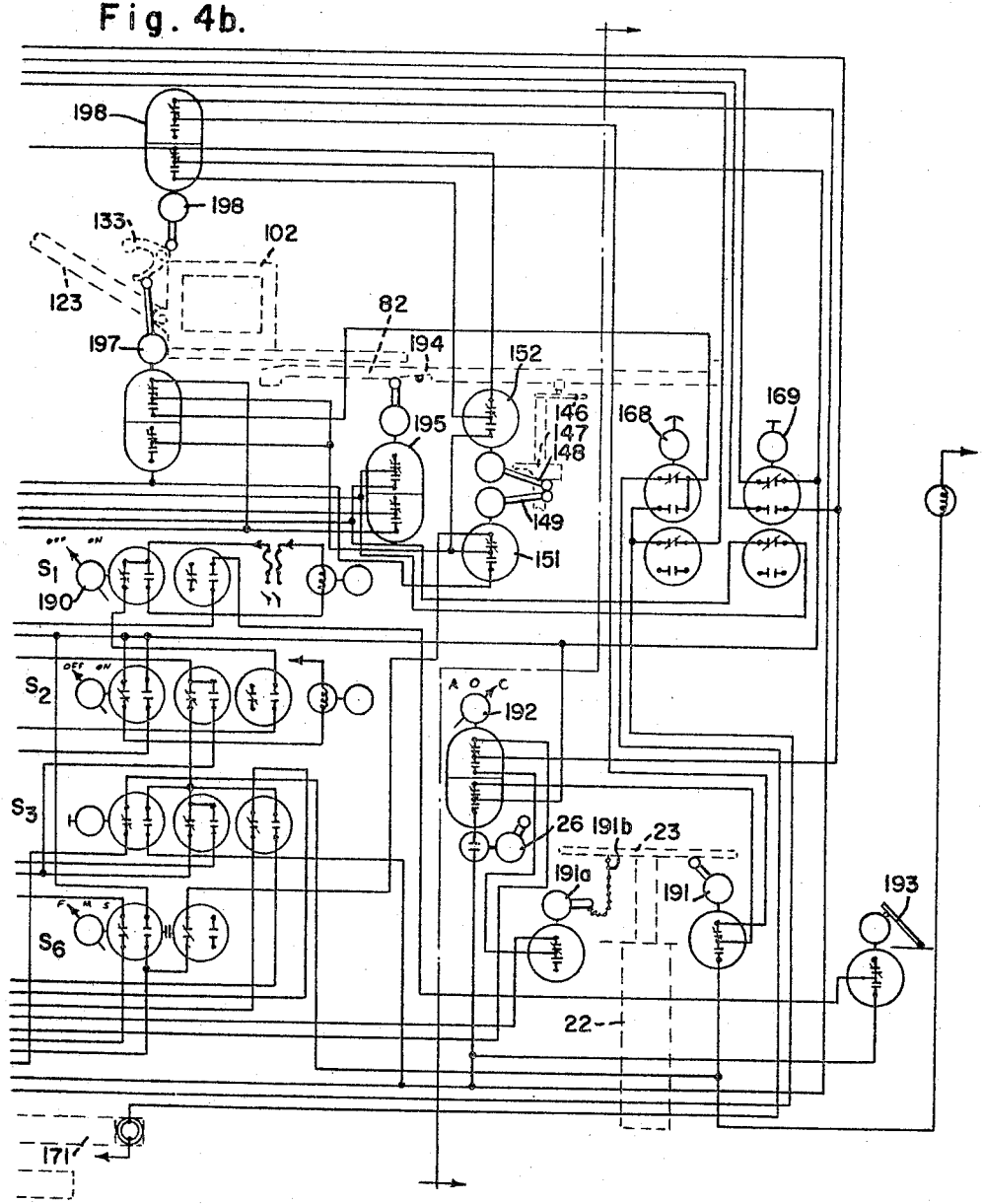

Aug. 9, 1966    R. F. KRUPP    3,265,223
MACHINE FOR UNLOADING RETORT CRATES
Original Filed Dec. 26, 1961    12 Sheets-Sheet 7
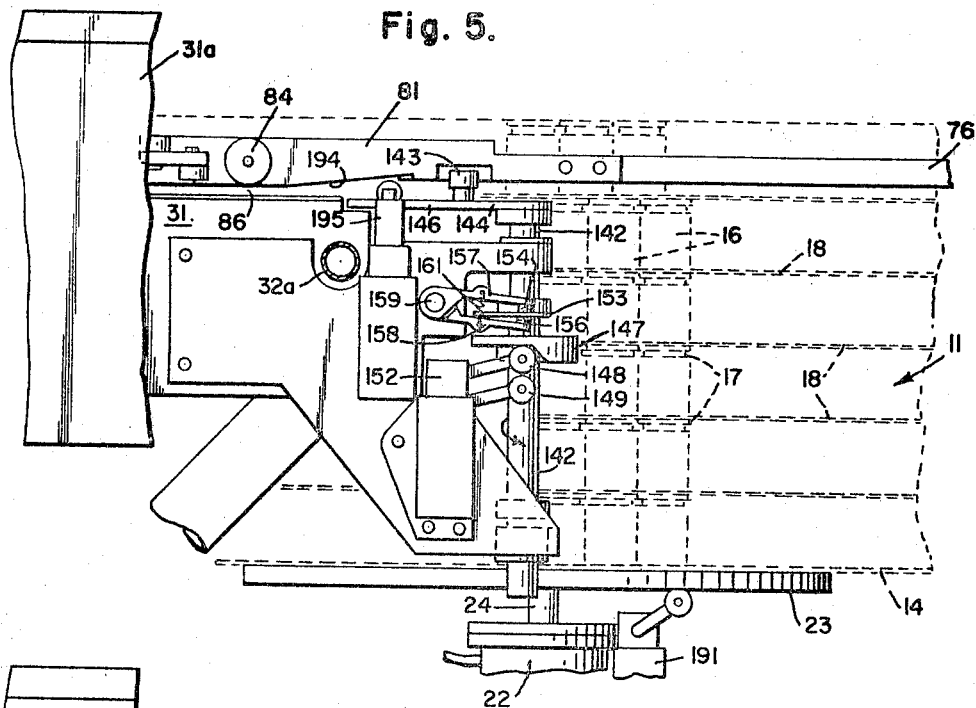
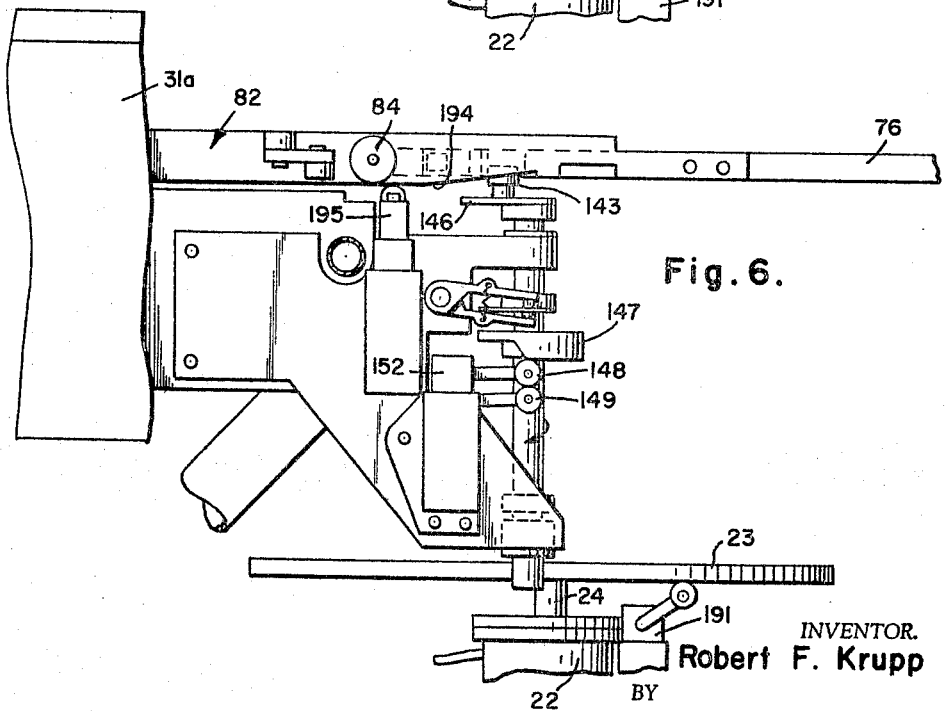
INVENTOR.
Robert F. Krupp
BY Aug. 9, 1966 R. F. KRUPP 3,265,223
MACHINE FOR UNLOADING RETORT CRATES
Original Filed Dec. 26, 1961 12 Sheets-Sheet 8

INVENTOR.
Robert F. Krupp
BY

Aug. 9, 1966 R. F. KRUPP 3,265,223
MACHINE FOR UNLOADING RETORT CRATES
Original Filed Dec. 26, 1961 12 Sheets-Sheet 9

INVENTOR.
Robert F. Krupp
BY
*attorneys*

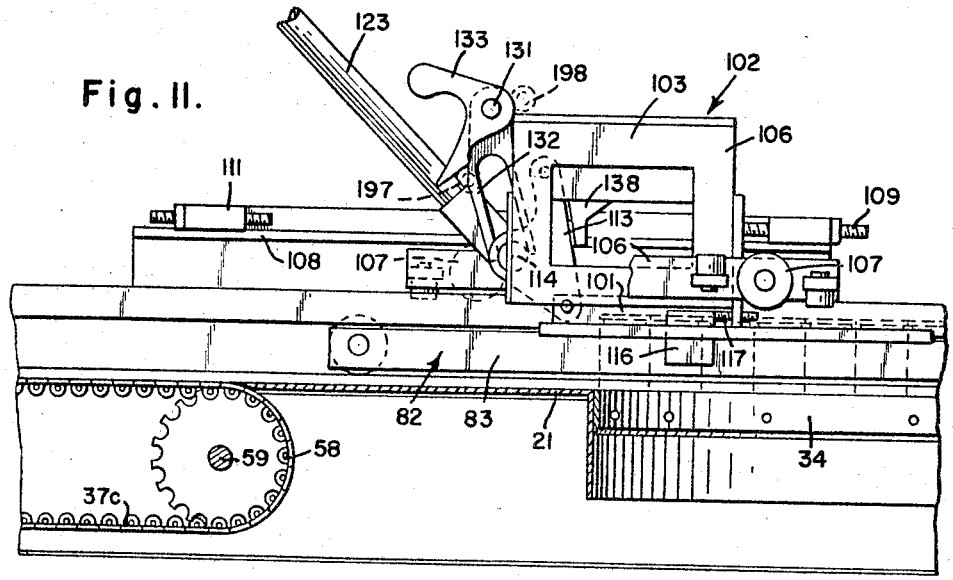
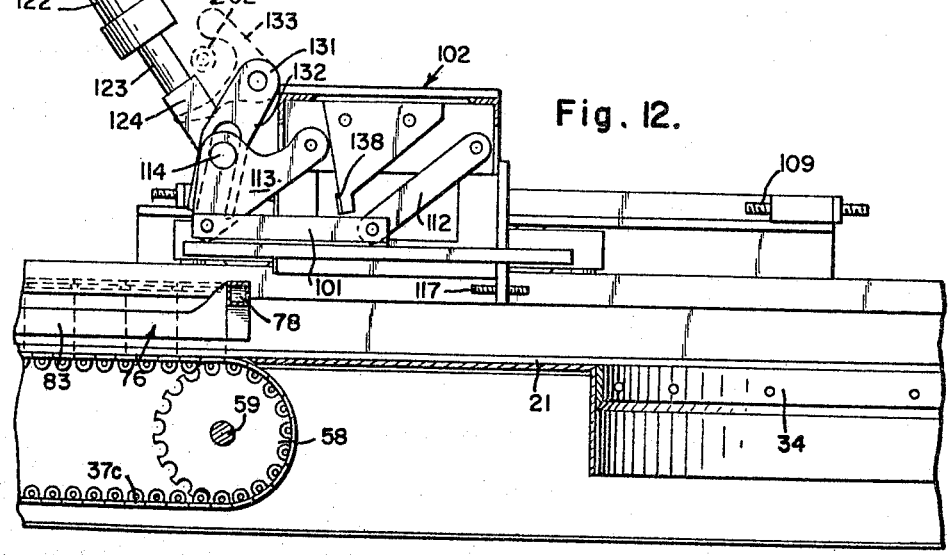

INVENTOR.
Robert F. Krupp

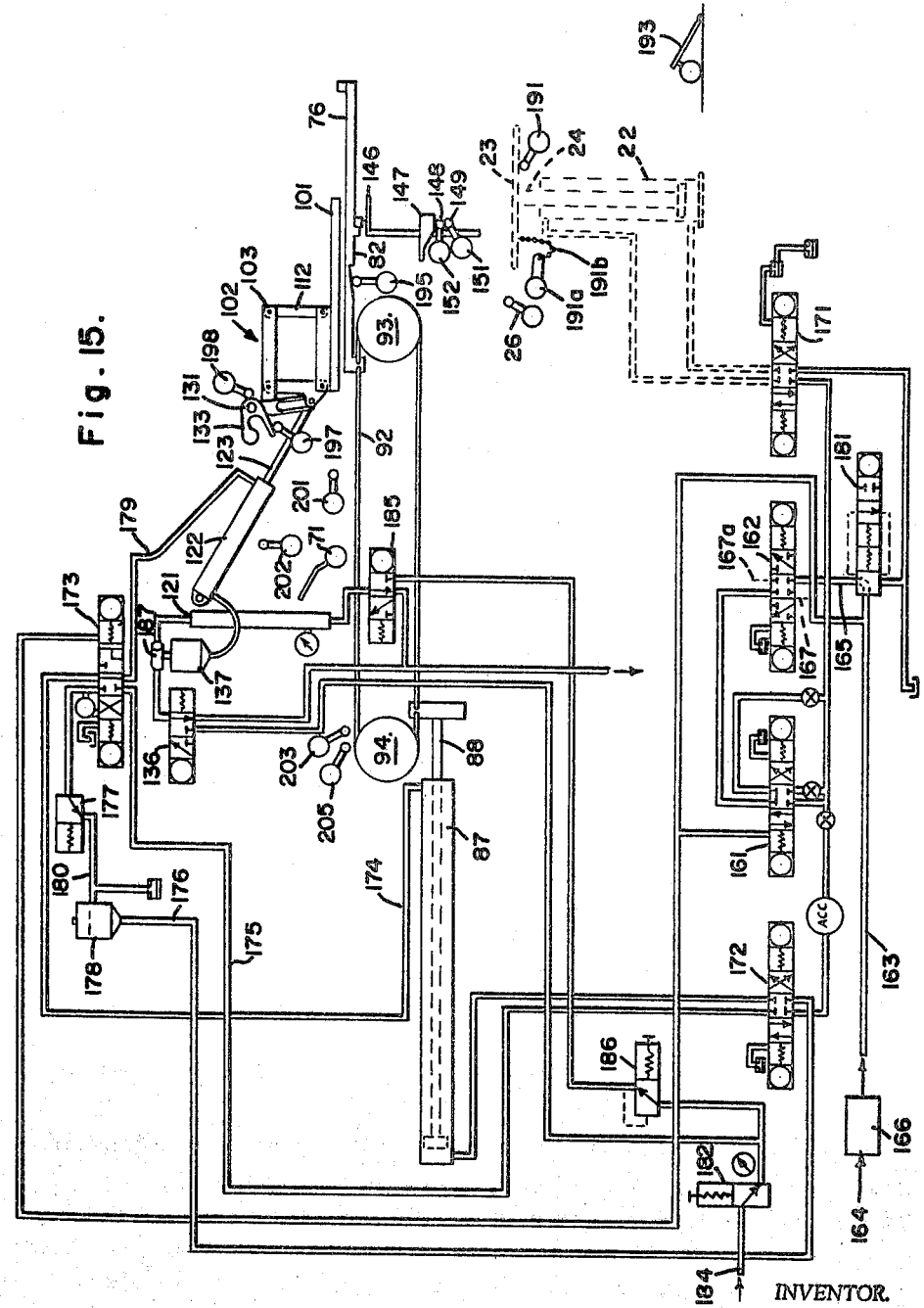

United States Patent Office 3,265,223
Patented August 9, 1966

3,265,223
MACHINE FOR UNLOADING RETORT CRATES
Robert F. Krupp, Oakland, Calif., assignor to Gerber Products Company, Fremont, Mich.
Original application Dec. 26, 1961, Ser. No. 162,003, now Patent No. 3,198,361, dated Aug. 3, 1965. Divided and this application Mar. 1, 1965, Ser. No. 443,744
4 Claims. (Cl. 214—8.5)

This application is a division of application Serial No. 162,003, filed December 26, 1961, and now Patent No. 3,198,361.

This invention relates to a new and improved machine for unloading retort crates of the type used in heat processing of containers for food products.

At the present, one means for heat processing the contents of containers is the provision of crates holding a plurality of containers which are, after loading, positioned in a retort and subjected to heat and pressure for a required period of time and then removed and unloaded. This means of processing is used particularly for small containers, such as jars and cans of infant foods. The crates used in retorting comprise cylindrical baskets having upwardly sliding bottoms and provided with handles at the top used to lift the crate from the loading station to the retort and to the unloading station. A layer of containers is filled onto the bottom of the crate and then a perforated separator placed over the top of the lowermost layer of containers, and then another layer filled onto the separator, and the layers and separators repeated until the capacity of the crate is attained. Ordinarily, each layer contains a maximum number of containers but this desirable result is not always achieved.

Considerable labor has heretofore been required to unload the crates. It is a principal object of the present invention to reduce the labor thus required.

Still another object of the present invention is to control the handling of the containers during the unloading operation, and particularly to reduce the likelihood of damage to the containers or to the seals between the containers and their closures.

A still further feature of the invention is the fact that if, as has heretofore been mentioned, one or more layers of containers in the crate is below capacity, nevertheless, the layer may be unloaded without danger of tipping containers or otherwise damaging the same.

A still further feature of the invention is the provision of means whereby once a crate has been positioned at the unloading machine and the unloading operation initiated, the layers are automatically brought ot the proper height so that they may be swept from the crate and into a single-filing machine whereupon they may be transferred to other stations for further operations, such as labeling, casing, etc., as required. In this connection, means is provided to insure that each layer of containers is automatically brought to the aforementioned proper level, and means is provided whereby containers in the crate which might interfere with proper leveling are moved out of the way so that a feeler may sense the proper level without interference.

Still another feature of the invention is the provision of means, including interlocking of various hydraulic valves, to prevent mis-operation of the machine and to prevent damage either to the containers or to the machine itself.

Another feature of the invention is the fact that the various mechanical movements involved in bringing the crate layers to proper height and sweeping the layers off the crate are hydraulically operated, which insures positive and closely-controlled movement, again decreasing the likelihood of damage either to the containers or to the machine.

Other objects of the present invention will become apparent upon reading the following specification and referring to the accompanying drawings in which similar characters of reference represent corresponding parts in each of the several views.

In the drawings:

FIGS. 2a and 2b are composite top plan views.

FIG. 3 is a view similar to FIG. 2a, showing the machine in a different position in its cycle of operation.

FIGS. 4a and 4b are composite views showing schematically portions of mechanical devices and electric circuits employed in energizing the mechanical portion.

FIG. 5 is a fragmentary side elevational view of a portion of the machine shown in one position of its cycle of operation.

FIG. 6 is a view similar to FIG. 5, showing the machine in a different position in its cycle of operation.

FIG. 11 is a fragmentary side elevational view, partly broken away in section, of a portion of the machine, showing the parts in one position of the cycle of operation.

FIG. 12 is a view similar to FIG. 11, showing the parts in a different position.

FIG. 14 is an enlarged fragmentary side elevational view, the location of such view being shown approximately by arrows 14—14 in FIG. 2a.

FIG. 15 is a schematic view showing portions of mechanical devices and hydraulic and pneumatic circuits employed in actuating the mechanical devices.

Figure 1:
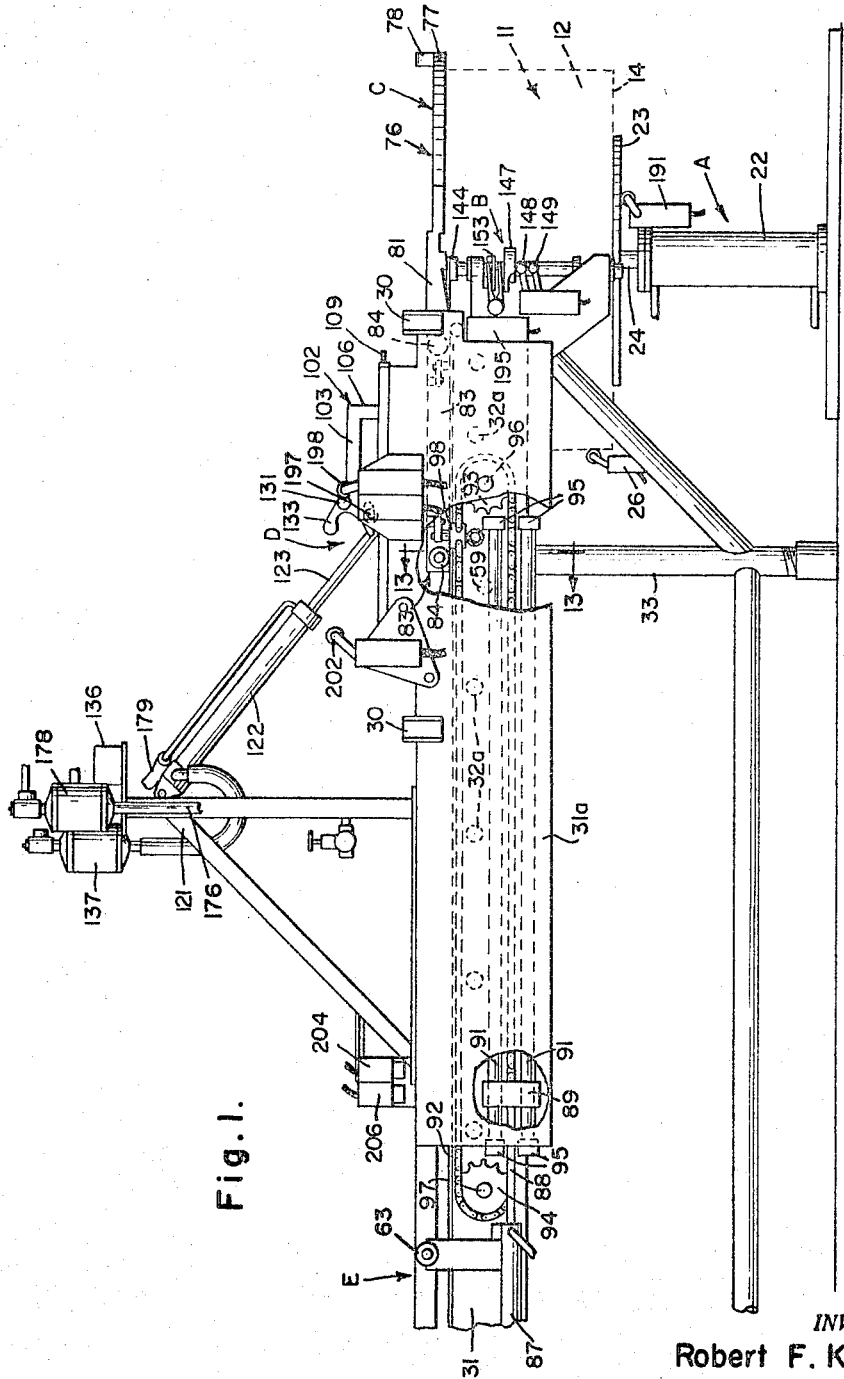
FIG. 1 is a side elevational view of a portion of the machine, partly broken away in section.

The present invention is used in unloading retort crates 11. Such crates have a cylindrical side 12, having a handle at the top which may be used to lift the crate by means of a crane or other conveyor. The bottom 14 of the crate is vertically slidable inside the side 12 so that by pushing upward on the bottom and holding the side stationary, layers of containers 16 may be brought up above the level of the upper edge of side 12 for unloading. Containers 16 may be of various types, but as herein illustrated comprise glass jars having metal caps 17 of the type used in packing infants' foods. Such containers 16 are relatively small and are most conveniently heat processed by batch retorting. The containers 16 are loaded into the crate 11 with their axes upright in layers and between each layer is a perforated separator or tray 18. It is desirable that each layer contain enough containers to almost completely fill the cross-section of the crate, but such optimum conditions do not always prevail. The object of the present invention is to unload a crate layer by layer by mechanical means, all as hereinafter described in detail.

The machine which is the subject of the present invention provides means for locating crate 11 in position at one end thereof and comprises elevator means A for pushing upwardly on movable bottom 14 of crate 11 to raise each layer of containers 16 step by step to the elevation of the main table 21 of the machine. Control means B is provided for controlling automatically elevator A which raises the crate bottom. Further, sweep means C is provided for sweeping each layer of containers 16 from the crate onto table 21, with the provision of an auxiliary gathering means D which compresses the layer horizontally during the sweeping movement to compensate for any condition which might tend to cause the containers to tip such as, for example, the presence of less than a full capacity of containers in any particular layer. The machine further provides a horizontal conveyor E which receives jars pushed off the table, arranges them in single file and conveys them away to a subsequent station. Thus the machine comprises several stations, the function and sequence of which is integrated so that a continuous and smooth operation is performed. For clarity in understanding the various parts of the machine and their function it is necessary, however, to describe each station separately.

*Elevator—Station A*

At the right hand end of the machine, as viewed in FIGS. 1 to 3, inclusive, there is provided elevator station A. Elevator A consists of a vertical hydraulic cylinder 22 having a platform 23 on the upper end of the cylinder rod 24 of a diameter less than that of slidable bottom 14 of crate 11. The crate 11 is located in the position shown in FIG. 1 with bottom 14 resting on platform 23. The handle of the crate is positioned to the right, as viewed in FIG. 1, where the handle does not interfere with the sweeping operation for removal of the containers. A switch 26 is located adjacent elevator A, and closes when crate 11 is properly positioned. The hydraulic controls hereinafter described permit retraction of the sweep means C only when switch 26 is closed. The function of elevator A is to raise bottom 14, and hence the various layers of containers superimposed thereon, one layer at a time to the proper elevation for unloading of the crate. The hydraulic system actuating cylinder 22 and the controls B for said system are hereinafter described.

*Main frame and conveyor mechanism—Station E*

Elevator A heretofore described is located spaced a short distance in front of the main portion of the machine, it being understood that in this specification the terms "front" and "rear" refer to the right hand end of FIG. 2a and the left left hand end of FIG. 2b, respectively, unless otherwise defined or otherwise clearly indicated from the context. The frame comprises essentially horizontally-longitudinally extending channel members 31 on either side of the machine, inter-connected by transverse horizontal ties 32 and supported at intervals by legs 33. At the front end of the machine is transversely extending horizontal main plate 21 which is located at the level of the bottoms of the containers 16 as they are being unloaded from the crate. Plate 21 has a front edge 34 curved complementary to crate 11 and reinforced by arcuate rim 36. Rearwardly on main plate 21 is conveyor system E consisting of five endless conveyor belts 37a, 37b, 37c, 37d, 37e which extend rearwardly longitudinally of the machine. At the rear of the machine is a short belt 37f, which is driven by a drive sprocket 38 at its rearward end, sprocket 38 being mounted on transverse shaft 39 driven from electric motor 41 by sprockets 42, 43 and drive chain 44. The opposite end of belt 37f passes around idler 40 on shaft 45. The two conveyor belts 37b, 37c on the left hand side of the machine, as viewed from the front end, are driven by sprockets 46 on transverse shaft 47 journaled in frame members 31. Shaft 47 is driven from shaft 39 by means of sprockets 48, 49 and chain 51. The three right hand conveyor belts 37a, 37d and 37c are driven by sprockets 52 on transverse shaft 53 journaled in frame members 31, such shaft 53 being driven from shaft 47 by means of sprockets 54, 56 and chain 57. The forward ends of all of the conveyor belts 37a–e pass around idler sprockets 58 on transverse shaft 59 at the front of the machine journaled in frame member 31.

Figure 13:
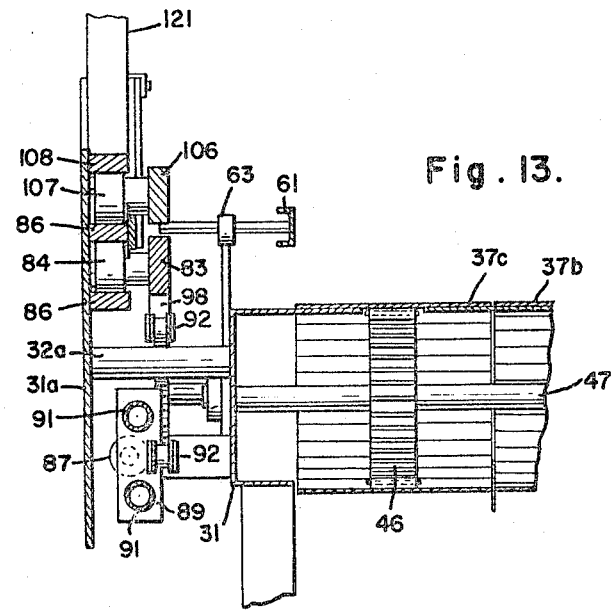
FIG. 13 is a fragmentary end elevational view, partly broken away in section, taken substantially along the line 13—13 of FIG. 1.
Figure 14:
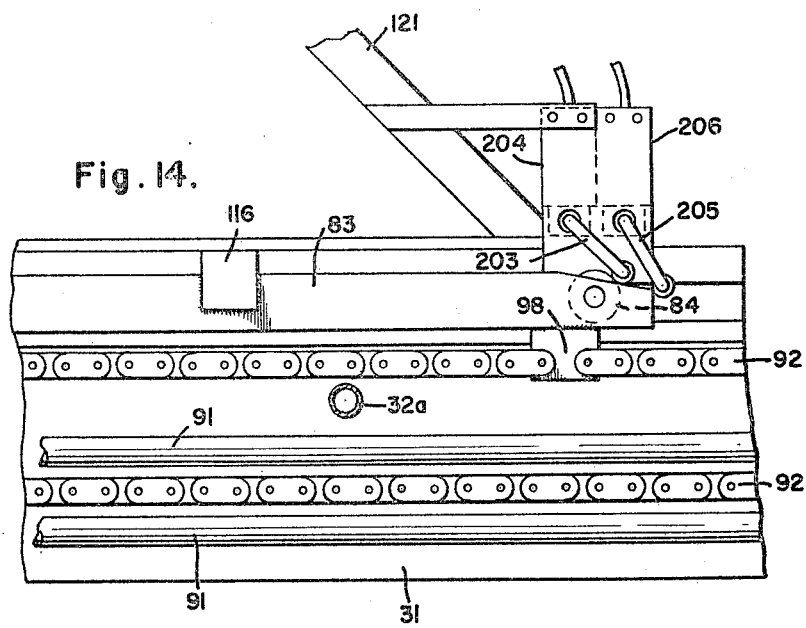

Adjacent the front of the machine are left and right side guides 61, 62 along either edge of the conveyor system. As shown particularly in FIG. 13, guide 61 is supported above member 31 by T-shaped bracket 63 upstanding from side members 31 and also by brackets 30 on side plates 31a which extend parallel to channels 31 for a portion of their length and are, in turn, supported by supports 32a. Approximately half the length of the frame the right guide 62 merges with diagonally rearwardly-leftwardly directed guide 64 which extends to about the left-hand conveyor belt 37c. From this position guide 64 merges with rearwardly-rightwardly slanted guide 66 which extends to the right-hand edge of the center conveyor belt 37f. The left-hand guide 61 merges at about the point of beginning of guide 66 into a rearwardly-rightwardly slanted stretch 67 gradually converging toward guide 66 until the two guides 66, 67 are spaced apart at their rearward termini about the width of the containers 16 being handled. The rearward termini of guides 66, 67 are at about the rearward end of center conveyor belt 37f adjacent the right-hand side thereof and are so positioned as to connect up with another conveyor (not shown) leading to another station in the operation.

Crowd switch 71 is located adjacent left guide 61 spaced somewhat rearwardly of the front end of the machine. The function of crowd switch 71 is to project into the path of travel of the containers as they are conveyed away from main plate 21 by the conveyor system E. If for some reason there should be an interruption of the flow of containers into the next station so that they back up on conveyor E, the mass of containers will press against switch 71 thereby interrupting the crate unloading operation and preventing an overcrowding of the reserve capacity of conveyor E. At the same time, it will be noted that there is sufficient space in the conveyor system E to compensate for unbalanced demand of containers in the next station of the machine and also to permit a sufficient number of containers to accumulate so that the line below this machine will not be interrupted by failure to receive the containers while the empty crate is being removed and a filled crate installed, or when some other interference with the operation of the unloading operation mechanism occurs.

*Unloading sweep—Station C*

Horizontally longitudinally reciprocal sweep yoke 76 is mounted for longitudinal reciprocation immediately above the level of main plate 21. Sweep 76 at its forward end has a curved arm 77 of approximately the same radius of curvature as the retort crate, bent up at offset 78 to allow for holding of dividers 18 and on either side merges into short rearward extension 79. Outside extension 79 is a laterally offset rearward extending bracket 81 which is connected at its rearward end to sweep-carriage 82. Sweep-carriage 82 consists of horizontal members 83 carrying rollers 84 received in longitudinal tracks 86 on either side of the machine and mounted on plate 31a, thereby controlling the horizontal reciprocation of the sweep. Movement of the sweep is actuated by main sweep hydraulic cylinder 87 horizontally mounted alongside the frame and having a forwardly extending rod 88. The forward end of rod 88 is connected to slide 89 which slides on vertically spaced longitudinally extending guide rods 91 mounted on side channels 31 by spacers 95 at each end. On either side of the machine is a continuous sweep chain 92 which passes around front and rear sprockets 93, 94 on front and rear transverse shafts 96, 97, respectively. Slide 89 is fixed to left-hand chain 92 on its lower stretch and sweep-carriage 82 is fixed to chains 92 by means of fittings 98 on their upper stretches. Thus, as the hydraulic cylinder 87 is energized rod 88 is pushed forwardly which causes the sweep-carriage 82 to move rearwardly and reversal of cylinder 87 causes a reverse movement.

Gathering arm—Station D

Associated with the sweep C is gathering arm D having gathering arm 101 which likewise has a curvature approximately the same as the radius of crate 11 but curving in a direction opposite to that of arm 77. When sweep 76 and gathering arm 101 are projected to the forwardmost positions of their cycle of movement, they embrace a layer of containers 16 above the level of crate 11, sweep 76 being forwardly of the crate and gathering arm yoke 101 being immediately rearwardly thereof. Sweep 76 is of an elevation slightly higher than that of main plate 21, whereas gathering arm 101 is slightly higher than the elevation of sweep 76. Gathering arm 101 is connected to gathering carriage 102 consisting of longitudinal top members 103 on either side of the machine interconnected by transverse members 104 supported by vertical legs 106. Legs 106 provided with rollers 107 which slide in horizontal longitudinal tracks 108 immediately above tracks 86. Adjustable front and rear stops 109, 111 on either side of the machine limit longitudinal movement of carriage 102. Arm 101 is connected to carriage 102 in parallelogram fashion, there being, on either side of the machine, front links 112 and rear links 113 each pivotally connected at their upper ends to carriage 102 and at their lower ends to arm 101. Rear links 113 are interconnected by transverse rod 114. The parallelogram mounting just described enables arm 101 to be raised and lowered relative to plate 21. Sweep-carriage 82 carries a block 116 projecting upwardly which engages adjustable stop 117 on gathering carriage 102 so that when sweep-carriage 82 has reached a position approaching its limit of forward movement the gathering arm carriage 102 is moved to a position herein denominated the "A" position where it is slightly retracted from the curved forward edge 34 of the table 21. The rearward movement of the gathering arm 101 and its carriage 102 is accomplished by sweep 76 pressing rearwardly against containers 16 and the containers in turn pressing rearwardly against the gathering arm 101. Because of the difference in elevation of sweep 76 and gathering arm 101 the pattern of the containers embraced between arms is non-circular and thereby the containers are securely held.

Mounted above the frame is a superstructure 121 which extends transversely across the machine rearwardly of the limit of movement of gathering arm 101. Depending downwardly-forwardly from superstructure is gathering arm cylinder 122 having rod 123 provided with fitting 124 mounted on rod 114. Retraction of rod 123, when carriage 102 is at the rearward limit of its travel, causes raising of arm 101, and extension of rod 123 when carriage 102 is at the forward limit of its travel causes lowering of arm 101.

Pivotally mounted on carriage 102 is second transverse rod 131 and on rod 131 is bifurcated lever 132 which is engaged by transverse rod 114. The left end of rod 131 carries irregularly-shaped cam 133. When arm 101 is elevated by retraction of piston rod 123 in cylinder 122, rod 114 rises between the bifurcations of lever 132 and causes rod 131 to pivot clockwise and thus causes oscillation of cam 133. Cam 133 controls certain switches for purposes which hereinafter appear.

In the foregoing description it has been stated that in the "A" forward position of arm 101 it is slightly retracted from the forward edge 34 of table 21. The purpose of this retraction is to permit raising of a layer of containers 16 without possibility of jamming under arm 101. After the containers are raised to approximately full elevation valve 136 is opened which admits compressed air to reservoir 137 connected to the end of cylinder 122 which fully advances arm 101 to "B" position. Stop 138 on carriage 102 limits forward movement of arm 101.

Elevator control mechanism—Station B

Figure 7:
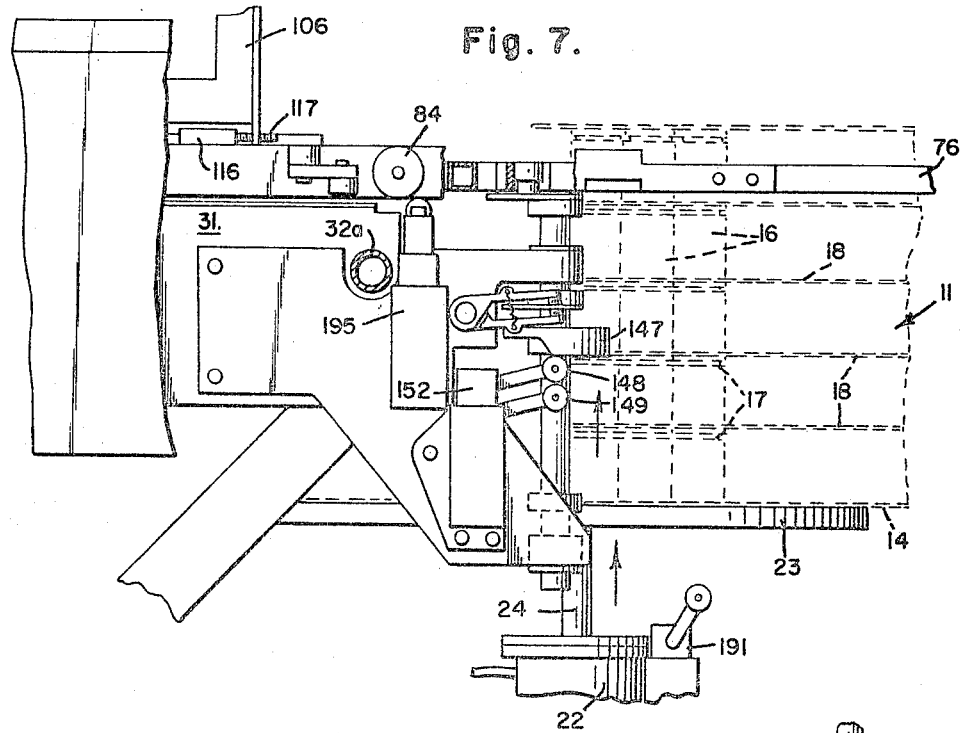
FIG. 7 is a view similar to FIG. 5, showing the machine in still another position of operation.
Figure 8:
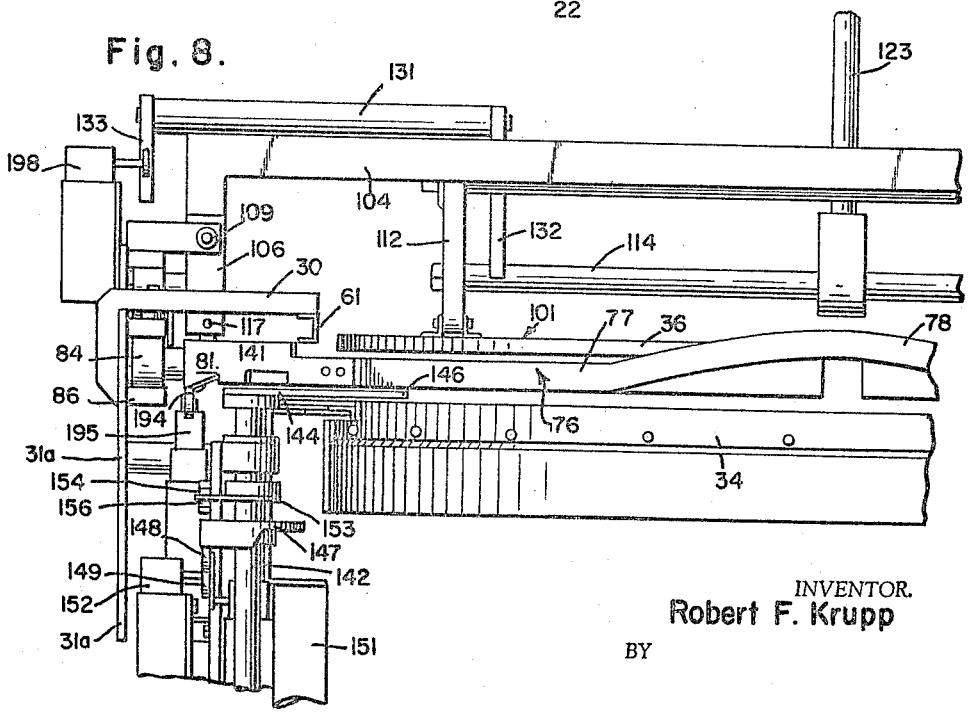
FIG. 8 is a fragmentary end elevational view of the structure of FIG. 5.
Figure 9:
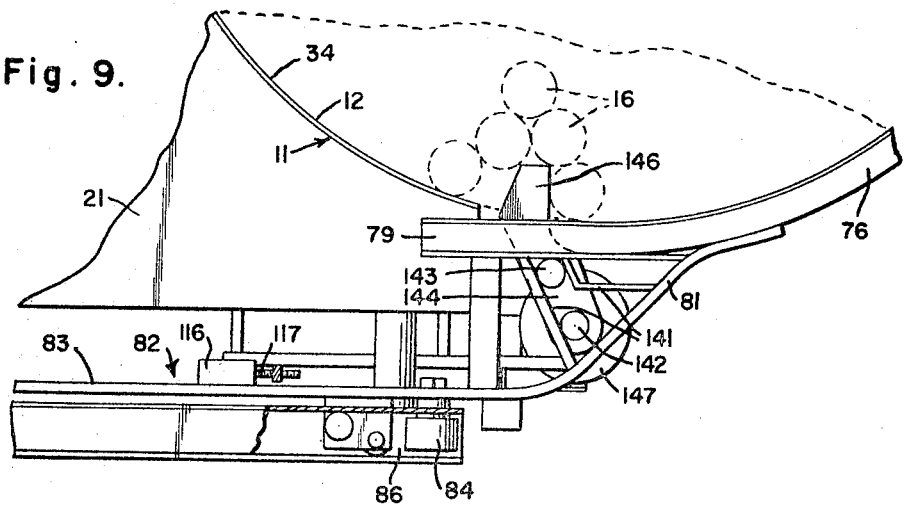
FIG. 9 is a top plan view of a portion of the structure of FIG. 5, showing the parts in one position of the cycle of operation.
Figure 10:
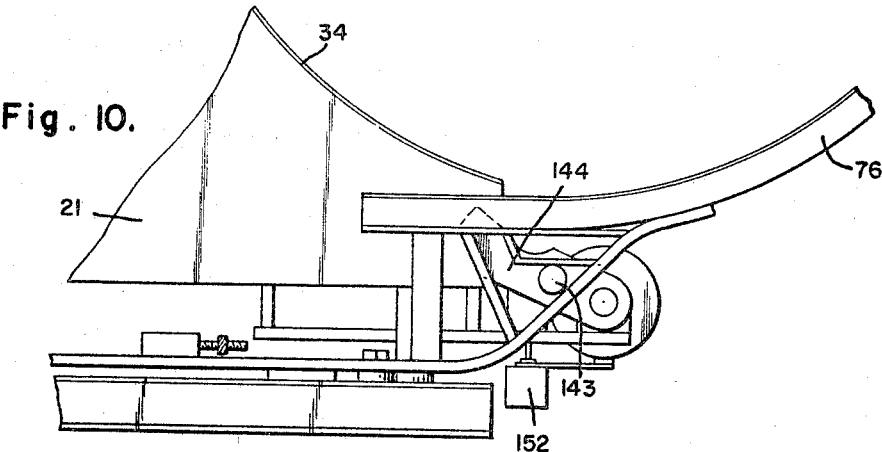
FIG. 10 is a view similar to FIG. 9, showing the parts in a different position of the cycle.

The left hand bracket 81 of sweep 76 is formed with a cam 141. The elevator control B consists primarily of a vertical shaft 142 which oscillates and also moves vertically. Rotational oscillation of control shaft 142 is accomplished by reason of cam 141 contacting cam follower roller 143 on arm 144 on shaft 142. Thus as the sweep 76 reaches the forward end of its stroke, shaft 142 oscillates in a clockwise direction as viewed from above in FIGS. 9 and 10. The outer end 146 of arm 144 comprises a feeler which, in the position shown in FIG. 9 as contrasted with the position shown in FIG. 10, overhangs the crate 11. The elevation of feeler 146 is such that as it moves from the position shown in FIG. 10 to the position shown in FIG. 9 under the influence of cam 141, the outer end of the feeler pushes aside any jars 16 which may interfere with proper leveling. The function of feeler 146 is to sense the separator 18 or the bottom 14 of crate 11. Thus normally, under the influence of gravity, feeler 146 is in the position shown in FIG. 6. However, as elevator A moves the contents of the crate upward, the uppermost separator 18 or bottom 14 contacts feeler 146 and raises arm 144 and shaft 142. Vertical shaft 142 carries cam 147 designed to contact top switch roller 148. When feeler 146 is in the position shown in FIG. 5, and cam 147 is consequently in a position with its "low" dwell over roller 148, there is no contact with roller 148. However, when feeler 146 is oscillated outwardly to intersect the outline of crate 11, the high dwell of cam 147 bears against top roller 148 and, in turn, top roller pushes downwardly on bottom roller 149. When feeler 146 is lifted by separator 18 from the position of FIG. 6 to the position of FIG. 7, cam 147 is raised and this allows top and bottom rollers 148, 149 to rise which throws first switch 151 and then switch 152 controlled by rollers 149 and 148, respectively. Switch 151 slows down the movement of elevator 23 and switch 152 stops such movement at the precise required elevation of the topmost layer of containers.

Also mounted on vertical shaft 142 is horizontal brake disc 153. Top and bottom brake shoes 154, 156 bear against the top and bottom surfaces of disc 153, shoes 154, 156 being mounted on the outer end of clamp arms 157 and 158, respectively. Arms 157, 158 are mounted on horizontal pivot 159 and are biased toward each other by means of spring 161. The function of brake shoes 154, 156 is to retard rotational movement of shaft 142 to prevent overmovement thereof, but, at the same time, brake shoes 154, 156 may move in a vertical direction as shaft 142 is raised and lowered.

Hydraulic, pneumatic and electrical control system

Schematic FIGS. 4a, 4b and 15 illustrate certain of the important mechanical elements which have heretofore been described. The cylinders 22, 87, 122 which control movement of the elevator 23, sweep 76 and gathering arm 101 are there shown. The hydraulic system is so arranged that a slow, medium and high rate of oil delivery can be supplied to elevator 23 and sweep cylinders 87, the rate being controlled by hydraulic valve 161. The various cams which control the various switches are shown in the schematic diagram and their function is described in the section on operation which follows. It will be seen that there are various solenoid-controlled hydraulic valves which are in turn controlled by the various switches, all as is described in the section on operation.

Preliminarily, however, it may be said with respect to the hydraulic system that there is a main feed valve 162 which receives fluid through conduit 163, 165 and valve 181 from pump 164 drawing from tank 166. Valve 162 in neutral position as shown in FIG. 15 cuts the hydraulic system off and when in a position moved to the left transmits hydraulic fluid from another source through conduits 167 and 167a to equipment used to raise and lower crates by left devices (not shown). When in position to the right, valve 162 transmits hydraulic pressure through various other valves to mechanism herein described for unloading crates. Speed control valve 161 controls the slow, medium and full speed of cylinders 22 and 87. Load lift valve 171 is used to control elevator cylinder 22 to raise or lower the crate bottom 14. Valve 171 delivers to cylinder 22 at any of three speeds, depending upon the setting of the speed control valve 161. Similarly, sweep direction control valve 172 controls the direction of sweep cylinder 87 in any of the three speeds, depending upon the setting of the speed control valve 161.

Gathering head cylinder control valve 173 governs the gathering arm cylinder 122 and in its left position establishes communication between the rod end discharge conduit 174 from sweep cylinder 87 to the gathering control cylinder 122 through conduit 179 and through conduit 175, valve 172 and drain line 176 which lead to overflow tank and vacuum breaker 178 and thence to tank 166. In its middle position, valve 173 establishes communication between the rod end discharge conduit 174 of the sweep cylinder 87 and the rod end of the gathering arm cylinder 122 through conduit 179. In the right position of valve 173, communication is established from conduit 174 to drain conduit 175 and the gathering cylinder 122 to drain through back pressure valve 177 and conduit 180.

Valve 187 is a high-low check valve which either admits high pressure air from valve 136 to the reservoir 137 or bleeds from tank 137 to give a constant supply of low pressure air from valves 185 and 186 to tank 137.

Air is directed from supply conduit 184 to high pressure control valve 182 and thence to secondary supply pressure regulator 186 which are interconnected through valves 185, 136 and check valve 187 and thence to hydraulic-pneumatic surge tank 137 connected to the piston end of cylinder 122. Thus, when valve 136 is energized, high pressure air is introduced to tank 137 to energize cylinder 122 to move arm 101 from retracted to "A" position. When valve 136 is energized a second time, high pressure air is admitted to tank 137 which results in a surge of high pressure hydraulic fluid to cylinder 122 to advance arm 101 from "A" to "B" position. When valve 136 is de-energized low pressure air is admitted to tank 137 to provide hydraulic fluid pressure to cylinder 122 to provide gathering force on the jars between gathering arm 101 and yoke 76 as yoke 76 moves in its delivering cycle.

FIGS. 4a and 4b show switch $S_1$ which the main power off-on switch, herein sometimes designated by reference numeral 190. Switch $S_2$ is the pressure off-on switch. Switch $S_3$ is the gathering arm reset switch. Switch $S_6$ is a manual switch to permit three speed operation at "fast," two speed operation at "medium" and only the slowest speed at "slow."

All arrows not connected to a specific element in the electrical circuit indicate connection to the same power line. The inlet of the power line is shown adjacent $S_1$. The arrows lead to the right hand line.

*Operation*

In the initial position of the cycle, the sweep 76 and gathering arm 101 are both retracted and cylinders 87 and 122 are in extended and retracted positions respectively. Main supply line switch S, is closed which energizes relay $R_2$ through switch 206 and relay $R_3$ is deenergized by switch 192 being in the "change" position (indicated as "C"). In this position it is possible to install a new crate 11 into position on platform 23 by actuation of manual valve and hoist (not shown). When the crate is properly installed resting upon elevator platform 23, limit switch 26 is actuated to show the crate in position. Thereupon switch 192 is manually actuated to the "auto" position ("A") to close relay $R_3$, energize valve 172 to the left and valve 162 to the right, thus establishing the unloading control circuit. Switch 192 may be placed in the "off" position ("O") as a safety precaution when desired, thereby stopping all operation.

To initiate the cycle of unloading, switch 192 being in "auto" ("A") position, pedal switch 193 is depressed to energize valve 181 to create hydraulic pressure and begin forward movement of sweep carriage 82. Initial movement of sweep carriage 82 is slow since switch 204 is activated and energizes valve 161 in the low speed position. When switch 204 is deactivated through movement of carriage 82, then valve 161 is energized in the high speed position to give sweep carriage 82 rapid travel. When block 116 approaches adjusting screw 117, block 116 activates switch 201 to deenergize relay $R_1$ and shift valve 161 to the medium speed position. Carriage 82 and gathering frame 102 are then moved forward at this reduced speed. When carriage 82 contacts switch 195 through cam 194, valve 161 is energized in the slow speed position to accurately locate carriage 82 and gathering frame 102 over the retort basket 11, as well as to swing arm 146 into outward position with a gentle action and to activate switches 151 and 152 through cam 147. Carriage 82 and frame 102 stop forward travel when cam 133 activates switch 198, dropping out relays $R_2$ and $R_3$ and deenergizing valve 172. Activation of switch 198 also energizes valve 136 to admit high pressure air to force gathering arm 101 downwardly from the retracted position to position A, which causes cam 133 to activate contact switch 197.

Activating switch 197 deenergizes valve 136 and energizes valve 171 to cause cylinder 22 to raise platform 23 and lift jars 16. During the lift cycle, switch 168 may be operated manually to reverse the action of cylinder 22 if required. Separators 18 contact and raise arm 146 until switch 151 is deactivated, energizing valve 161 into slow position and activating valve 136 to move gathering valve 173 to left-hand position and valve 173 is held in such position by relay $R_1$.

Let it be assumed that a malfunctioning of the elevator mechanism occurs so that it is desired to initiate the return cycle but not to complete the same. The importance of this feature will be understood when it is stated that the ordinary travel of sweep carriage 82 is 54 inches, but by means of a shortened cycle this can be reduced to a mere 18 inches travel, thereby shortening the necessary recycling time. No delivery would occur if the operator noticed that instead of the feeler arm 146 being located between containers 16 so that it is contacted by separator 18 between layers it is, on the contrary, contacting by the caps 17 of the containers so that no container will be fed on the sweep stroke. Thereupon switch 169 is manually thrown which initiates the part cycle operation. The carriage 82 for the sweep 76 travels rearwardly a mere 18 inches and the gathering arm 101 is pushed rearwardly by the sweep and then is raised by contraction of gathering arm cylinder 122. When carriage 102 engages switch 202, the reverse movement heretofore described is again initiated.

In the normal sequence of operation, the feeler 146 is between containers 16 and for such purpose the arm 144 pivots outwardly which normally pushes any interfering containers out of the way. When the elevator cylinder 22 has properly leveled crate 11, as heretofore explained, the sweep carriage 82 begins to move rearwardly and the sweep 76 pushes the top layer of containers rearwardly, the containers pushing against the gathering arm 101 and hence likewise moving that arm 101 and its carriage 102 rearwardly. Relays $R_1$, $R_2$ and $R_3$ are deenergized during this movement. Thus, by reason of the difference in elevation of the sweep 76 and the gathering arm 101 the containers 16 in the top layer are embraced between the two arms and prevented from tilting as they are moved rearwardly off of the separator and onto the main plate 21. At the beginning, the sweep carriage 82 starts at slow speed and goes into medium speed when carriage 102 no longer activates switch 198. When cam 133 contacts switch 202, relay $R_1$ is actuated which in turn deenergizes valve 173. Valve 173 moves to middle position, causing cylinder 122 to receive the full discharge from cylinder 87 which is fed through valve 173 and conduits 174 and 179 to the rod end of gathering arm cylinder 122 which raises gathering arm 101 above the level of the tops of the containers. When cylinder 122 is in fully retracted position, gathering arm 101 is in position above the top of containers 16 to prevent accidental contact therewith. The completion of this movement causes rod 114 to move lever 132 which turns rod 131 and hence cam 133 is disengaged from switch 202, stopping retraction of cylinder 122 by actuating valve 173 to its right-hand position and shifting valve 161 to high speed. Thereafter, carriage 82 travels at high speed, as the sweep carriage 82 approaches the end of its cycle, carriage 82 contacts arm 203 which throws switch 204 and shifts the speed of carriage 82 to slow, and when the carriage reaches the end of its stroke it contacts arm 205 of reverse switch 206. If, and only if switch 192 is in "auto" position, switch 206 energizes relays $R_2$ and $R_3$ and sweep carriage 82 begins reverse movement. If, however, switch 192 is in the "change" position, such as when it is desired to replace an empty crate 11 with a full one, switch 192 does not allow switch 204 to energize relay $R_3$ and then stops on contacting of switch 206. When switch 192 is in "change" position, it permits rearward movement but prevents forward movement of sweep carriage 82 until the new crate 11 has been installed and switch 192 is in "auto" position.

So long as switch 192 is in "auto" position the cycle has been repeated and repetition continues until all of the layers of containers in the crate are emptied. When the last layer of containers has been moved off crate bottom 14, the operator should turn switch 192 to "change" position. However, if he should forget to do so, switch 191a is connected to platform 23 through chain 191b. Switch 191a stops carriage 82 in its full rearward position. Subsequent turning of switch 192 from "auto" to "change" or such turning as the last layer of containers is being delivered energizes valve 171 to right-hand position, after switch 206 is actuated by carriage 82, causing cylinder 122 to retract, lowering platform 23 until it actuates switch 191 thereby deenergizing valve 171 and shifting valve 162 to left-hand position to allow for changing the crate.

Each layer of containers pushed off crate 11 is first moved onto the table 21 and then from table 21 is pushed onto the conveyor system 37a, 37b, 37c, 37d, 37e, 37f and then arranged in single file and conveyed away. If for some reason there is an interference with discharge of the containers from the conveyor system, they crowd back onto the belts 37a–c and finally press against crowd switch 71 which stops further unloading of containers from the crate. Because there is a considerable volume of containers in the capacity of the conveyor system, any unevenness in discharge of containers is avoided, a feature which is particularly important when the empty crate is being removed and a new crate installed in place, an operation which of necessity consumes a certain amount of time but which in accordance with the present invention does not necessitate closing down the line beyond the unloading machine.

What is claimed is:

1. In a retort crate unloading machine for use with a crate of the type having an upwardly sliding bottom and wherein containers are stacked within the crate in layers with separators between layers, an elevator comprising a platform to receive the sliding bottom of a crate, elevating means for raising said platform in increments and subsequently lowering said platform, and control means for said elevating means, said control means comprising a feeler projectable to a position adjacent the paths of movement of said platform to contact the uppermost separator in said crate, a switch responsive to upward movement of said feeler and responsive when said feeler is raised up to a preselected level to deactivate said elevating means.

2. An elevator according to claim 1 which further comprises a second switch responsive to upward movement of said feeler and responsive when said feeler is raised to a level slightly below said preselected level to slow upward movement of said elevating means.

3. An elevator according to claim 1 which further comprises means for moving said feeler from a position remote from said platform to said position adjacent the path of movement of said platform, whereby containers are pushed out of the path of movement of said feeler so that said feeler is moved vertically by the uppermost separator and is not moved by containers on said separator.

4. An elevator according to claim 3 which further comprises cam means contacting said switch to deactivate said elevating means when said feeler is in position remote from said platform.

References Cited by the Examiner
UNITED STATES PATENTS

| | | | |
|---|---|---|---|
| 1,997,078 | 4/1935 | Reimers et al. | 221—13 X |
| 2,314,632 | 3/1943 | Rear | 221—13 |
| 2,659,497 | 11/1953 | Verrinder | 214—8.5 |
| 2,870,895 | 1/1959 | McDaniel | 221—13 |
| 2,944,702 | 7/1960 | Fenton | 221—13 |
| 3,107,770 | 10/1963 | Short | 221—232 X |

SAMUEL F. COLEMAN, *Primary Examiner.*